(12) United States Patent
Silvi et al.

(10) Patent No.: US 10,217,541 B2
(45) Date of Patent: Feb. 26, 2019

(54) AMORPHOUS POLYCARBONATE FILMS FOR CAPACITORS, METHODS OF MANUFACTURE, AND ARTICLES MANUFACTURED THEREFROM

(71) Applicant: SABIC GLOBAL TECHNOLOGIES B.V., Bergen Op Zoom (NL)

(72) Inventors: Norberto Silvi, Clifton Park, NY (US); Qin Chen, Schenectady, NY (US); Gary Stephen Balch, Ballston Spa, NY (US); James Alan Mahood, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 362 days.

(21) Appl. No.: 15/055,059

(22) Filed: Feb. 26, 2016

(65) Prior Publication Data

US 2016/0180985 A1  Jun. 23, 2016

Related U.S. Application Data

(63) Continuation of application No. 13/469,918, filed on May 11, 2012, now abandoned.

(60) Provisional application No. 61/485,305, filed on May 12, 2011.

(51) Int. Cl.
| | | |
|---|---|---|
| *H01B 3/42* | (2006.01) | |
| *C08J 5/18* | (2006.01) | |
| *H01G 4/18* | (2006.01) | |
| *H01G 4/008* | (2006.01) | |
| *H01G 4/32* | (2006.01) | |

(52) U.S. Cl.
CPC .............. *H01B 3/426* (2013.01); *C08J 5/18* (2013.01); *H01G 4/008* (2013.01); *H01G 4/18* (2013.01); *C08J 2369/00* (2013.01); *H01G 4/32* (2013.01); *Y10T 428/24355* (2015.01)

(58) Field of Classification Search
CPC .......... H01B 3/426; H01G 4/008; H01G 4/18; H01G 4/32; C08J 5/18; C08J 2369/00; C08L 69/00; C08G 64/04; C08G 64/06
See application file for complete search history.

(56) References Cited

U.S. PATENT DOCUMENTS

| | | |
|---|---|---|
| 3,484,664 A | 12/1969 | Liddicoat |
| 3,740,623 A | 6/1973 | Toro |
| 3,932,250 A * | 1/1976 | Sato ........................ B29C 63/00 156/213 |
| 4,604,303 A | 8/1986 | Takakura et al. |
| 4,679,122 A | 7/1987 | Belke, Jr. et al. |
| 4,895,760 A | 1/1990 | Barger |
| 5,229,482 A | 7/1993 | Brunelle |
| 5,260,407 A | 11/1993 | Saruwatari et al. |
| 5,357,033 A | 10/1994 | Bendler et al. |
| 5,636,100 A | 6/1997 | Zheng et al. |
| 5,714,243 A | 2/1998 | Mammino et al. |
| 6,033,483 A | 3/2000 | Demaray et al. |
| 6,420,011 B1 | 7/2002 | Tsunekawa et al. |
| 6,426,861 B1 | 7/2002 | Munshi |
| 6,511,701 B1 | 1/2003 | Divigalpitiya et al. |
| 6,559,270 B1 | 5/2003 | Siclovan et al. |
| 6,586,791 B1 | 7/2003 | Lee et al. |
| 6,720,379 B1 | 4/2004 | Campbell et al. |
| 6,974,620 B1 | 12/2005 | Tsunekawa et al. |
| 8,218,291 B2 | 7/2012 | Silvi et al. |
| 8,779,040 B2 | 7/2014 | Van Der Weele et al. |
| 2003/0156377 A1* | 8/2003 | Weber ..................... H01G 4/015 361/311 |
| 2003/0171494 A1 | 9/2003 | Aramaki et al. |
| 2004/0247921 A1 | 12/2004 | Dodsworth et al. |
| 2007/0108490 A1* | 5/2007 | Tan ........................ H01G 4/20 257/296 |
| 2007/0116976 A1 | 5/2007 | Tan et al. |
| 2007/0117886 A1 | 5/2007 | Tan et al. |
| 2007/0148467 A1 | 6/2007 | St. Lawrence et al. |
| 2007/0169886 A1 | 7/2007 | Watanabe et al. |
| 2007/0258190 A1 | 11/2007 | Irwin et al. |
| 2008/0004404 A1 | 1/2008 | van de Grampel et al. |

(Continued)

FOREIGN PATENT DOCUMENTS

| | | |
|---|---|---|
| EP | 2108673 A1 | 10/2009 |
| GB | 1458712 | 12/1976 |

(Continued)

OTHER PUBLICATIONS

Zhang, S., et al.; High Dielectric Constant Polymer Film Capacitors, 2010, p. 1-7 (Year: 2010).*
International Search Report for International Application No. PCT/US2012/037665; International Filing Date May 11, 2012; dated Aug. 21, 2012; 6 Pages.
Irwin et al.; "Development of High Temperature Capacitors for High Density, High Temperature Applications"; SAE International Journal of Aerospace, vol. 1, No. 1; Jan. 2009; pp. 817-821.
JP2009141293 A; English Abstract; Date of Publication Jun. 25, 2009; 2 pages.

(Continued)

*Primary Examiner* — Robert S Jones
(74) *Attorney, Agent, or Firm* — Cantor Colburn LLP

(57) ABSTRACT

A film comprising a copolycarbonate, wherein the film is a uniaxially-stretched, extruded film comprising at least one film region having: an average thickness of more than 0 and less than 14 micrometers with a standard deviation of 0.8 micrometer to 1.6 micrometers, a surface having a surface roughness average of less than 0.04 micrometer as measured by optical profilometry, a dielectric constant at 1 kHz and room temperature of at least 2.7, a dissipation factor at 1 kHz and room temperature of 1% or less, and a breakdown strength of at least 620 Volt/micrometer; and the copolycarbonate has a Tg of greater than 180° C. and comprises carbonate units derived from a bisphenol compound of the formula (3).

23 Claims, No Drawings

(56) References Cited

U.S. PATENT DOCUMENTS

| | | |
|---|---|---|
| 2008/0044639 A1 | 2/2008 | Chan et al. |
| 2008/0044682 A1 | 2/2008 | Chan et al. |
| 2008/0088217 A1 | 4/2008 | Kim et al. |
| 2008/0119631 A1 | 5/2008 | Mullen |
| 2008/0123250 A1 | 5/2008 | Tan et al. |
| 2009/0045544 A1 | 2/2009 | Silvi et al. |
| 2009/0088504 A1 | 4/2009 | Chatterjee et al. |
| 2009/0154057 A1 | 6/2009 | Tan |
| 2009/0226711 A1 | 9/2009 | Silvi et al. |
| 2009/0245547 A1 | 10/2009 | Lee et al. |
| 2009/0318604 A1 | 12/2009 | De Kraker et al. |
| 2010/0020468 A1 | 1/2010 | Tan et al. |
| 2010/0079926 A1 | 4/2010 | Tan et al. |
| 2010/0172066 A1* | 7/2010 | Baer .............. B29C 47/0021 361/323 |
| 2010/0246094 A1 | 9/2010 | Tan et al. |
| 2010/0302707 A1 | 12/2010 | Tan et al. |
| 2011/0012438 A1 | 1/2011 | Kashiwagi et al. |
| 2011/0031845 A1 | 2/2011 | Kashiwagi et al. |
| 2011/0071261 A1 | 3/2011 | Hoeks et al. |
| 2011/0117348 A1* | 5/2011 | Takizawa ........ B29C 47/0021 428/220 |
| 2011/0216474 A1 | 9/2011 | Grosrenaud et al. |
| 2011/0299222 A1 | 12/2011 | Suzuki et al. |
| 2012/0081833 A1 | 4/2012 | Cao et al. |
| 2013/0003227 A1 | 1/2013 | Lowery et al. |
| 2013/0118581 A1 | 5/2013 | Zhou et al. |
| 2014/0355173 A1 | 12/2014 | Odle et al. |

FOREIGN PATENT DOCUMENTS

| | | |
|---|---|---|
| JP | S62272404 A | 11/1987 |
| JP | S63270760 A | 11/1988 |
| JP | 2001332443 A | 11/2001 |
| JP | 2005290378 A | 10/2005 |
| JP | 2009141293 A | 6/2009 |
| JP | 2010147329 A | 7/2010 |
| WO | 2012155116 A1 | 11/2012 |
| WO | 2014100341 A1 | 6/2014 |
| WO | 2015031627 A1 | 3/2015 |

OTHER PUBLICATIONS

JP2010147329 Abstract; Published Jul. 1, 2010; 2 pages.
Resorcinol—LGC, retrieved Nov. 12, 2014, Product Data Sheet; 1 page.
Silvi et al., U.S. Appl. No. 13/469,911, entitled "Amorphous Polyetherimide Films for Capacitors, Methods of Manufacture, and Articles Manufactured Therefrom", filed May 11, 2012.
Written Opinion of the International Search Report for International Application No. PCT/US2012/037665; International Filing Date May 11, 2012; dated Aug. 21, 2012; 7 pages.
SciFinder; American Chemical Society; 2016; 12 pages.

* cited by examiner

AMORPHOUS POLYCARBONATE FILMS FOR CAPACITORS, METHODS OF MANUFACTURE, AND ARTICLES MANUFACTURED THEREFROM

CROSS REFERENCE TO RELATED APPLICATIONS

This application is a continuation of U.S. patent application Ser. No. 13/469,918, filed May 11, 2102, which claims the benefit of U.S. Provisional Patent Application Ser. No. 61/485,305 filed May 12, 2011. The related applications are incorporated herein by reference in their entirety.

BACKGROUND OF THE INVENTION

This disclosure relates to polymer films, and in particular to amorphous polymer films useful for the manufacture of capacitors.

Electrostatic film capacitors with high volumetric energy density, high operating temperature, and long lifetime are critical components for pulse-power, automotive, and industrial electronics. Capacitors are essentially energy-storing devices having two parallel conductive plates separated by a thin layer of an insulating (dielectric) film. When a voltage is applied across the plates, the electric field in the dielectric displaces electric charges, and thus stores energy. The amount of energy stored by a capacitor depends on the dielectric constant and breakdown voltage of the insulating material, and the dimensions (total area and thickness) of the film, such that in order to maximize the total amount of energy that a capacitor can accumulate, the dielectric constant and breakdown voltage of the film are maximized, and the thickness of the film minimized. Because the physical characteristics of the dielectric material in the capacitor are the primary determining factors for the performance of a capacitor, improvements in one or more of the physical properties of the dielectric material in a capacitor can result in corresponding performance improvements in the capacitor component, usually resulting in performance and lifetime enhancements of the electronics system or product in which it is embedded.

Electrostatic film capacitors made from biaxially-oriented poly(propylene) (BOPP) have been used in applications requiring a low dissipation factor, high insulation resistance and low dielectric absorption, such as in electrical appliances, electronic equipment, oven and furnaces, refrigerators, automobiles, and home appliances. The low dielectric constant (Dk), which is about 2.2, and the maximum service temperature of about 100° C., limits the use of these capacitors in applications requiring high operating temperatures and/or high energy densities. Poly(carbonate) (also known as polycarbonate, or PC) films have a higher dielectric constant than BOPP films (about 3.0) and a higher maximum service temperature of about 125° C.

There accordingly remains a need in the art for new films and methods for their manufacture that can produce films of very high purity and with excellent electrical properties, in particular high breakdown strength, and high dielectric constant. It would be a further advantage if such films could operate at higher temperature than BOPP films. There remains a further need for efficient methods for producing such films that are amendable to industrial scale processes. It would be further advantage if such methods were environmentally friendly.

SUMMARY OF THE INVENTION

The invention relates to a film comprising a copolycarbonate, wherein the film is a uniaxially-stretched, extruded film comprising at least one film region having: an average thickness of more than 0 and less than 14 micrometers with a standard deviation of 0.8 micrometer to 1.6 micrometers, a surface having a surface roughness average of less than 0.04 micrometer as measured by optical profilometry, a dielectric constant at 1 kHz and room temperature of at least 2.7, a dissipation factor at 1 kHz and room temperature of 1% or less, and a breakdown strength of at least 620 Volt/micrometer; and the copolycarbonate has a Tg of greater than 180° C. and comprises carbonate units derived from a bisphenol compound of the formula

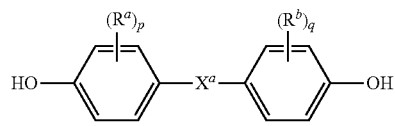

wherein $R^a$ and $R^b$ are each independently a halogen atom or a monovalent hydrocarbon group, p and q are each independently integers of 0 to 4, and $X^a$ is a $C_{1-18}$ alkylene group, a $C_{3-18}$ cycloalkylene group, a cycloalkylidene group comprising cyclododecylidene or adamantylidene, a fused $C_{6-18}$ cycloalkylene group, a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group, or a substituted $C_{3-18}$ cycloalkylidene of the formula

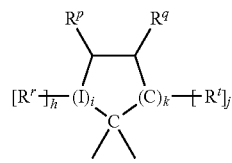

wherein $R^r$, $R^p$, $R^q$, and $R^t$ are independently hydrogen, halogen, oxygen, or a $C_{1-12}$ organic group, wherein at least two of $R^r$, $R^p$, $R^q$, and $R^t$ taken together are a fused cycloaliphatic, aromatic, or heteroaromatic ring, I is a direct bond, a carbon, or a divalent oxygen, sulfur, or —N(Z)— where Z is hydrogen, halogen, hydroxy, $C_{1-12}$ alkyl, $C_{1-12}$ alkoxy, phenyl, or $C_{1-12}$ acyl, and h is 0 to 2, j is 1 or 2, i is an integer of 0 or 1, and k is an integer of 0 to 3.

Articles comprising the above compositions are also disclosed.

In another embodiment, our invention relates to metallized uniaxially-stretched, extruded films.

In another embodiment, our invention relates to capacitors made from metallized uniaxially-stretched, extruded films.

In another embodiment, our invention relates to an electronic article comprising the capacitors made from wound metallized uniaxially-stretched extruded film.

DETAILED DESCRIPTION OF THE INVENTION

The present inventors have discovered that polycarbonate substrate films for electrostatic capacitors having excellent properties can be manufactured in a solventless process by extrusion. In a surprising and important feature, the extruded films can have large wrinkle-free regions having a breakdown strength of at least 300 Volts/micrometer. The wrinkle-free regions are sufficiently smooth and flat such that the substrate film can be metallized to provide a metallized film of substantially uniform breakdown strength across the region.

In particular, the wrinkle-free regions have a thickness of more than 0 and less than 7 micrometers, where any variation of the thickness of the film is ±10% of the average thickness of the film, and the surface roughness of the film is less than 3% of the average thickness of the film. The films provide both an increase in the capacitor dielectric constant and dielectric breakdown strength compared to prior art films, while retaining other advantageous physical and electrical characteristics, such as flexibility, thinness, and dielectric constant stability. In particular, the films can have a high voltage breakdown strength (at least 300 Volts/micrometer), a high dielectric constant (greater than 2.7), and a low dissipation factor (less than 1%). The films and capacitors made from the films accordingly offer advantages over current materials and methods for the manufacture of components for the electronics industry. A particular advantage is that the films can be reliably manufactured on an industrial scale in a solventless process. Removal of solvent from solvent-cast films can be difficult. The extruded films herein are processed without solvent, providing both a cost and a manufacturing advantage. In another embodiment, the extruded films are more than 0 and less than or equal to 13 microns.

Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

All molecular weights in this application refer to weight average molecular weights unless indicated otherwise. All such mentioned molecular weights are expressed in Daltons.

The terms "a" and "an" do not denote a limitation of quantity, but rather denote the presence of at least one of the referenced items. As used herein, "combination thereof" is inclusive of one or more of the recited elements, optionally together with a like element not recited. Reference throughout the specification to "an embodiment," "another embodiment," "an embodiment," "some embodiments," and so forth, means that a particular element (e.g., feature, structure, property, and/or characteristic) described in connection with the embodiment is included in at least an embodiment described herein, and can or cannot be present in other embodiments. In addition, it is to be understood that the described element(s) can be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms, such as to phenyl, tropone, indanyl, or naphthyl.

All ASTM tests are based on the 2003 edition of the Annual Book of ASTM Standards unless otherwise indicated.

The polycarbonate can be a polycarbonate homopolymer or a polycarbonate copolymer as further described below. Polycarbonates are polymers having repeating structural carbonate units (1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from an aromatic dihydroxy compound of the formula HO—$R^1$—OH, in particular (2)

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Also included are bisphenol compounds (3)

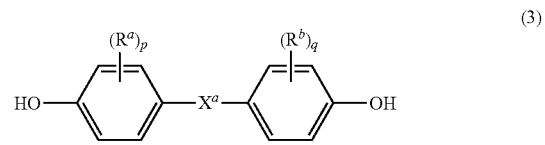

wherein $R^a$ and $R^b$ are each independently a halogen atom or a monovalent hydrocarbon group and may be the same or different; p and q are each independently integers of 0 to 4; and $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is a single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as a halogen, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In particular, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

Exemplary $C_{1-18}$ organic bridging groups include methylene, cyclohexylmethylene, ethylidene, neopentylidene, and isopropylidene, as well as 2-[2.2.1]-bicycloheptylidene and cycloalkylidenes such as cyclohexylidene, cyclopentylidene, cyclododecylidene, and adamantylidene. A specific example of bisphenol (3) wherein $X^a$ is a substituted cycloalkylidene is the cyclohexylidene-bridged, alkyl-substituted bisphenol (4)

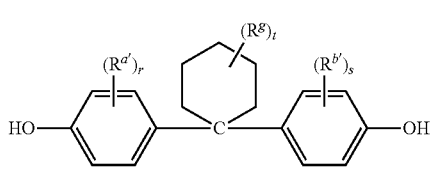

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ is disposed meta to the cyclohexylidene bridging group. The substituents $R^{a'}$, $R^{b'}$, and $R^g$ can, when comprising an appropriate number of carbon atoms, be a straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one).

$X^a$ in bisphenol (3) can also be a substituted $C_{3-18}$ cycloalkylidene (5)

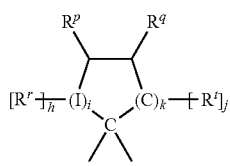

(5)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that when the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

In another specific embodiment of the bisphenol compound (3), the $C_{1-18}$ organic bridging group includes groups —C($R^c$)($R^d$)— or —C(=$R^e$)—, wherein $R^c$ and $R^d$ are each independently a hydrogen atom or a monovalent $C_{1-6}$ linear or cyclic hydrocarbon group and $R^e$ is a divalent hydrocarbon group, p and q is each 0 or 1, and $R^a$ and $R^b$ are each a $C_{1-3}$ alkyl group, specifically methyl, disposed meta to the hydroxy group on each arylene group.

Other useful aromatic dihydroxy compounds of the formula HO—$R^1$—OH include aromatic dihydric compounds (6)

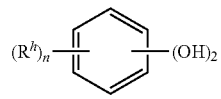

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds (3) include 1,1-bis(4-hydroxyphenyl)methane, 1,1-bis(4-hydroxyphenyl)ethane, 2,2-bis(4-hydroxyphenyl)propane (also known as "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl)phthalimidine (PPPBP), and 1,1-bis(4-hydroxy-3-methylphenyl) cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (13).

"Polycarbonate" as used herein includes homopolycarbonates (wherein each $R^1$ in the polymer is the same), copolymers comprising different $R^1$ moieties in the carbonate units (referred to herein as "copolycarbonates"), copolymers comprising carbonate units and other types of polymer units (such as ester units, diorganosiloxane units, urethane units, arylene ether units, arylene sulfone units, arylene ketone units, and combinations thereof), and combinations of at least one homopolycarbonate and/or at least one copolycarbonate and/or at least one polycarbonate copolymer. As used herein, a "combination" is inclusive of blends, mixtures, alloys, reaction products, and the like.

A specific polycarbonate copolymer is a poly(carbonate-ester). Such copolymers further contain, in addition to repeating carbonate units (1), repeating ester units (7)

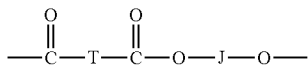

(7)

wherein J is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group. Poly(carbonate-ester)s containing a combination of different T and/or J groups can be used. The poly(carbonate-ester)s can be branched or linear.

In an embodiment, J is a $C_{2-30}$ alkylene group having a straight chain, branched chain, or cyclic (including polycyclic) structure. In another embodiment, J is derived from an aromatic dihydroxy compound (3). In another embodiment, J is derived from an aromatic dihydroxy compound (4). In another embodiment, J is derived from an aromatic dihydroxy compound (6).

Exemplary aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, J is a $C_{2-6}$ alkylene group and T is p-phenylene, m-phenylene, naphthalene, a divalent cycloaliphatic group, or a combination thereof.

The molar ratio of carbonate units to ester units in the copolymers can vary broadly, for example 1:99 to 99:1, specifically 10:90 to 90:10, more specifically 25:75 to 75:25, depending on the desired properties of the final composition.

A specific embodiment of a poly(carbonate-ester) (8) comprises repeating aromatic carbonate and aromatic ester units

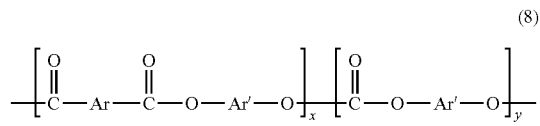

(8)

wherein Ar is divalent aromatic residue of a dicarboxylic acid or combination of dicarboxylic acids, and Ar' is a divalent aromatic residue of a bisphenol (3) or a dihydric compound (6). Ar is thus an aryl group, and is preferably the residue of isophthalic acid (9a), terephthalic acid (9b),

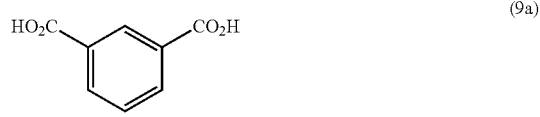

(9a)

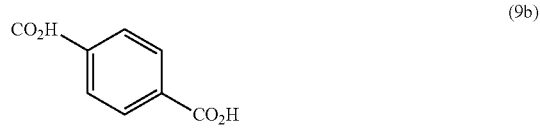

(9b)

or a combination thereof. Ar' may be polycyclic, e.g., a residue of biphenol or bisphenol A, or monocyclic, e.g., the residue of hydroquinone or resorcinol.

Further in the poly(carbonate-ester) (8), x and y represent the respective parts by weight of the aromatic ester units and the aromatic carbonate units based on 100 parts total weight of the copolymer. Specifically, x, the aromatic ester content, is 20 to less than 100 wt. %, specifically 30 to 95 wt. %, still more specifically 50 to 95 wt. %, and y, the carbonate content, is from more than zero to 80 wt. %, from 5 to 70 wt. %, still more specifically from 5 to 50 wt. %, each based on the total weight of units x+y. In general, any aromatic dicarboxylic acid conventionally used in the preparation of polyesters may be utilized in the preparation of poly(carbonate-ester)s (8) but terephthalic acid alone can be used, or mixtures thereof with isophthalic acid wherein the weight ratio of terephthalic acid to isophthalic acid is in the range of from 5:95 to 95:5. Poly(carbonate-ester)s (8) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE) and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC). In these embodiments the PCE or PPC (8) can be derived from the reaction of bisphenol-A and phosgene with iso- and terephthaloyl chloride, and can have an intrinsic viscosity of 0.5 to 0.65 deciliters per gram (measured in methylene chloride at a temperature of 25° C.).

In another specific embodiment, a poly(carbonate-ester) comprises carbonate units (1) derived from a bisphenol compound (3), and ester units derived from an aromatic dicarboxylic acid and dihydroxy compound (6). Specifically, the ester units are arylate ester units (9)

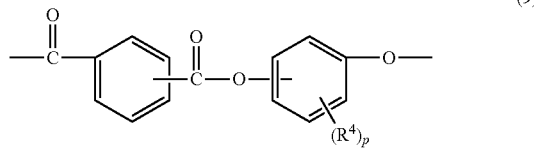

wherein each $R^4$ is independently a halogen or a $C_{1-4}$ alkyl, and p is 0 to 3. The arylate ester units (9) can be derived from the reaction of a mixture of terephthalic acid and isophthalic acid or chemical equivalents thereof with compounds such as 5-methyl resorcinol, 5-ethyl resorcinol, 5-propyl resorcinol, 5-butyl resorcinol, 5-t-butyl resorcinol, 2,4,5-trifluoro resorcinol, 2,4,6-trifluoro resorcinol, 4,5,6-trifluoro resorcinol, 2,4,5-tribromo resorcinol, 2,4,6-tribromo resorcinol, 4,5,6-tribromo resorcinol, catechol, hydroquinone, 2-methyl hydroquinone, 2-ethyl hydroquinone, 2-propyl hydroquinone, 2-butyl hydroquinone, 2-t-butyl hydroquinone, 2,3,5-trimethyl hydroquinone, 2,3,5-tri-t-butyl hydroquinone, 2,3,5-trifluoro hydroquinone, 2,3,5-tribromo hydroquinone, or a combination comprising at least one of the foregoing compounds. The arylate ester units (8) can be poly(isophthalate-terephthalate-resorcinol ester) units, also known as "ITR" esters.

The poly(carbonate-ester)s comprising arylate ester units (9) can comprise, based on the total weight of the copolymer, from 1 to less than 100 wt. %, 10 to less than 100 wt. %, 20 to less than 100 wt. %, or 40 to less than 100 wt. % of carbonate units (1) derived from a bisphenol compound (3), and from greater than 0 to 99 wt. %, greater than 0 to 90 wt. %, greater than 0 to 80 wt. %, or greater than 0 to 60 wt. % of ester units derived from an aromatic dicarboxylic acid and dihydroxy compound (6). A specific poly(carbonate-ester) comprising arylate ester units (9) is a poly(bisphenol-A carbonate)-co-poly(isophthalate-terephthalate-resorcinol ester).

In another specific embodiment, the poly(carbonate-ester) contains carbonate units (1) derived from a combination of a bisphenol (3) and an aromatic dihydric compound (6), and arylate ester units (9). The molar ratio of carbonate units derived from bisphenol (3) to carbonate units derived from aromatic dihydric compound (6) can be 1:99 to 99:1. A specific poly(carbonate-ester) of this type is a poly(bisphenol-A carbonate)-co-(resorcinol carbonate)-co(isophthalate-terephthalate-resorcinol ester).

The polycarbonates can further comprise siloxane units, for example a poly(carbonate-siloxane) or a poly(carbonate-ester-siloxane). The siloxane units are present in the copolymer in polysiloxane blocks, which comprise repeating siloxane units (10)

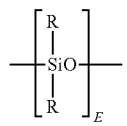

wherein each R is independently the same or different $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The value of E in formula (10) can vary depending on the type and relative amount of each component in the composition, the desired properties of the, and like considerations. Generally, E has an average value of 5 to 50, specifically 5 to about 40, more specifically 10 to 30. A combination of a first and a second (or more) copolymers can be used, wherein the average value of E of the first copolymer is less than the average value of E of the second copolymer.

In an embodiment, the polysiloxane blocks are of formula (11) or (12)

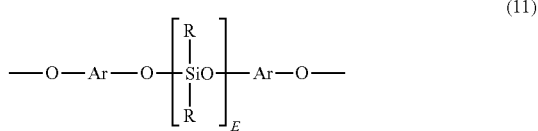

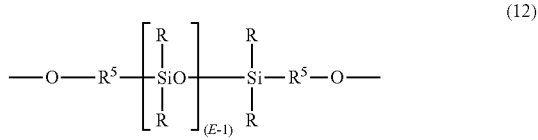

wherein E is as defined in siloxane (10) and each R can be the same or different, and is as defined in siloxane (1). Each Ar in blocks (11) and (12) can be the same or different, and is a substituted or unsubstituted $C_6$-$C_{30}$ arylene group, wherein the bonds are directly connected to an aromatic moiety. The Ar groups in (11) can be derived from a bisphenol (3), for example 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis (4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing compounds can also be used. Each $R^5$ in formula (12) is independently a divalent $C_1$-$C_{30}$ organic group, for example a divalent $C_2$-$C_8$ aliphatic group.

In a specific embodiment, the polysiloxane blocks are of formula (13):

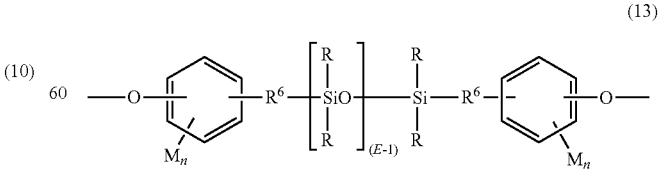

wherein R and E are as defined in formula (10); $R^6$ is a divalent $C_2$-$C_8$ aliphatic group; each M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-18}$ alkyl, haloalkyl such as trifluoropropyl, cyanoalkyl, or $C_{6-8}$ aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

In an embodiment, the polycarbonate is a poly(carbonate-siloxane) which comprises carbonate units (1) derived from a bisphenol (3), specifically bisphenol A, and siloxane units (13) wherein M is methoxy, n is one, $R^2$ is a divalent $C_1$-$C_3$ aliphatic group, and R is methyl. The poly(carbonate-siloxane)s can comprise 50 to 99 wt. % of carbonate units and 1 to 50 wt. % siloxane units. Within this range, the poly (carbonate-siloxane)s can comprise 70 to 98 wt. %, more specifically 75 to 97 wt. % of carbonate units and 2 to 30 wt. %, more specifically 3 to 25 wt. % siloxane units.

In another embodiment, the polycarbonate is a poly (carbonate-ester-siloxane) which comprises carbonate units (1) derived from a bisphenol (3), specifically bisphenol A; siloxane units (13) wherein M is methoxy, n is one, $R^2$ is a divalent $C_1$-$C_3$ aliphatic group, and R is methyl and ester units (9), specifically (isophthalate-terephthalate-resorcinol) ester units.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing esters. In addition, useful transesterification catalysts can include phase transfer catalysts of formula $(R^3)_4Q^+X$, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polyester-polycarbonates in particular can also be prepared by interfacial polymerization as described above with respect to polycarbonates generally. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute. Combinations of polycarbonates of different flow properties can be used to achieve the overall desired flow property. In an embodiment polycarbonates are based on bisphenol A, in which each of $A^3$ and $A^4$ is p-phenylene and $Y^2$ is isopropylidene. The weight average molecular weight of the polycarbonate can be 5,000 to 100,000 Daltons, or, more specifically 10,000 to 65,000 Daltons, or, even more specifically, 15,000 to 35,000 Daltons as determined by GPC as described above.

The polyester-polycarbonates in particular are generally of high molecular weight and have an intrinsic viscosity, as determined in chloroform at 25° C. of 0.3 to 1.5 dl/gm, and preferably from 0.45 to 1.0 dl/gm. These polyester-polycarbonates may be branched or unbranched and generally will have a weight average molecular weight of from 10,000 to 200,000, preferably from 20,000 to 100,000 as measured by GPC as described above.

The poly(carbonate-siloxane)s can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards. The poly(carbonate-siloxane) can have a melt volume flow rate, measured at 300° C./1.2 kg, of 1 to 50 cubic centimeters per 10 minutes (cc/10 min), specifically 2 to 30 cc/10 min.

Mixtures of polyorganosiloxane-polycarbonates of different flow properties can be used to achieve the overall desired flow property.

The foregoing polycarbonates can be used alone or in combination, for example a combination of a homopolycarbonate and one or more poly(carbonate-ester)s, or a combination of two or more poly(carbonate-ester)s. Blends of different polycarbonate-esters may be used in these compositions.

In an embodiment, the polycarbonate film forming compositions (and thus the films) contain less than 5 wt. % of fluorine, specifically less than 4 wt. %, less than 3 wt. %, less than 2 wt. %, less than 1 wt. %, each based on the total weight of the composition.

In another embodiment, the polycarbonate film-forming compositions and films contain less than 1000 ppm, specifically less than 750 ppm, less than 500 ppm, or less than 50 ppm by weight of a fluorine-containing compound. In a further embodiment, no fluorine-containing compound is present in the film-forming composition. Such compounds include, without limitation, certain mold release agents, fillers (e.g., particulate PTFE), or flame retardants.

In another embodiment, the polycarbonate film-forming compositions (and thus the films) contain less than 1000 ppm, specifically less than 750 ppm, less than 500 ppm, or less than 50 ppm by weight of a silicone compound. In an embodiment, no silicone compound is present in the film-forming composition or film. Such silicone compounds include, without limitation, silicone oils, and polydimethyl siloxanes.

In an embodiment, the polycarbonate film-forming compositions and films contain less than 1000 ppm, specifically less than 750 ppm, less than 500 ppm, or less than 50 ppm by weight of both a fluorine-containing compound and a silicone compound. In an embodiment, no fluorine-containing compound and no silicone compound is present in the film-forming compositions or films.

Good electrical properties are obtained when the polycarbonate film-forming compositions and films contain low levels of certain metal ions. Thus, the film-forming compositions and films contain less than 50 ppm, specifically less than 40 ppm, 30 ppm, or 20 ppm by weight of each of aluminum, calcium, magnesium, iron, nickel, potassium, manganese, molybdenum, sodium, titanium, and zinc.

In some embodiments it is desired to use polycarbonate film-forming compositions and films that are essentially free of bromine and chlorine. "Essentially free" of bromine and chlorine means that the composition has less than 3 wt. % of bromine and chlorine, and in other embodiments, less than 1 wt. % bromine and chlorine by weight of the film-forming composition. In other embodiments, the composition is halogen free. "Halogen free" is defined as having a halogen content (total amount of fluorine, bromine, chlorine and iodine) of less than or equal to 1000 parts by weight of halogen per million parts by weight of the total composition (ppm). The amount of halogen can be determined by ordinary chemical analysis such as atomic absorption.

The polycarbonate film-forming compositions can optionally further comprise one or more particulate fillers to adjust the properties thereof, for example dielectric constant, coefficient of thermal expansion, and the like. Exemplary particulate fillers include silica powder, such as fused silica and crystalline silica; boron-nitride powder and boron-silicate powders; alumina, and magnesium oxide (or magnesia); silicate spheres; flue dust; cenospheres; aluminosilicate (armospheres); natural silica sand; quartz; quartzite; titanium oxide, barium titanate, barium strontium, tantalum pentoxide, tripoli; diatomaceous earth; synthetic silica; and combinations thereof. All of the above fillers can be surface treated with silanes to improve adhesion and dispersion with the polymeric matrix resin. When present, the amount of particulate filler in the polycarbonate film-forming compositions can vary widely, and is that amount effective to provide the desired physical properties. In some instances the particulate filler is present in an amount from 0.1 to 50 vol. %, 0.1 to 40 vol. %, alternatively 5 to 30 vol. %, more particularly 5 to 20 vol. %, each based on the total weight of the film-forming composition.

The polycarbonate film-forming compositions can include various additives incorporated into dielectric substrate polymer compositions with the proviso that the additives are selected so as to not significantly adversely affect the desired properties of the compositions. In an embodiment, any additives are present in an amount that provides less than 1,000 ppm of a compound having a molecular weight of less than 250 Daltons. Exemplary additives include antioxidants, thermal stabilizers, light stabilizers, ultraviolet light (UV) absorbing additives, quenchers, plasticizers, lubricants, antistatic agents, flame retardants, antidrip agents, and radiation stabilizers. Combinations of additives can be used. The foregoing additives (except any fillers) are generally present individually in an amount from 0.005 to 20 wt. %, specifically 0.01 to 10 wt. %, based on the total weight of the film-forming composition.

Suitable antioxidants can be compounds such as phosphites, phosphonites and hindered phenols or mixtures thereof. Phosphorus-containing stabilizers including triaryl phosphites and aryl phosphonates are useful additives. Difunctional phosphorus containing compounds can also be unseeded. Preferred stabilizers can have a molecular weight greater than or equal to 300. Some exemplary compounds are tris-di-tert-butylphenyl phosphite available from Ciba Chemical Co. as IRGAPHOS 168 and bis (2,4-dicumylphenyl) pentaerythritol diphosphite available commercially from Dover Chemical Co. as DOVERPHOS S-9228.

Examples of phosphites and phosphonites include: triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butyl-phenyl)pentaerythritol diphosphite, tristearyl sorbitol triphosphite, tetrakis(2,4-di-tert-butyl-phenyl) 4,4'-biphenylene diphosphonite, bis(2,4-di-tert-butyl-6-methylphenyl)methyl phosphite, bis(2,4-di-tert-butyl-6-methylphenyl)ethyl phosphite, 2,2',2'-nitrilo[triethyl tris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite and 5-butyl-5-ethyl-2-(2,4,6-tri-tert-butyl-phenoxy)-1,3,2-dioxaphosphirane.

Combinations comprising more than one organophosphorous compound are contemplated. When used in combination the organophosphorous compounds can be of the same type or different types. For example, a combination can comprise two phosphites or a combination can comprise a phosphite and a phosphonite. In some embodiments, phosphorus-containing stabilizers with a molecular weight greater than or equal to 300 are useful. Phosphorus-containing stabilizers, for example an aryl phosphite are usually present in the composition in an amount from 0.005 to 3 wt. %, specifically 0.01 to 1.0 wt. %, based on total weight of the composition.

Hindered phenols can also be used as antioxidants, for example alkylated monophenols, and alkylated bisphenols or poly phenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol and mixtures thereof. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha, alpha-dimethylbenzyl)-4-nonylphenol], 4,4'-methylenebis-(2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane and mixtures thereof.

The hindered phenol compound can have a molecular weight of greater than or equal to 300 g/mole. The high molecular weight can help retain the hindered phenol moiety in the polymer melt at high processing temperatures, for example greater than or equal to 300° C. Hindered phenol stabilizers, are usually present in the composition in an amount from 0.005 to 2 wt. %, specifically 0.01 to 1.0 wt. %, based on total weight of the composition.

In some embodiments, the polycarbonate film-forming compositions can further optionally include at least one additional amorphous polymer, again with the proviso that the polymers are selected so as to not provide more than 5 wt. % of fluorine or silicon, or otherwise not significantly adversely affect the desired properties of the compositions. Examples of such additional polymers include and are not limited to poly(phenylene sulfone)s, poly(sulfone)s, poly (ether sulfone)s, poly(arylene sulfone), poly(phenylene ether)s, poly(etherimide)s, and poly(etherimide sulfone)s as well as blends and co-polymers thereof. When present, the polymer is used in an amount from more than 0 to 12 wt. %, specifically 0.1 to 10 wt. %, more specifically from 0.5 to 5 wt. %, all based on the total weight of the composition. In an embodiment, no polymer other than the polycarbonate is present in the film-forming composition.

The polycarbonate film-forming compositions can be prepared by blending the ingredients under conditions for the formation of an intimate blend. Such conditions often include melt mixing in single or twin screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the polycarbonate (and/or other additives) prior to melting. The melt processing is often done at 240° C. to 360° C. to avoid excessive polymer degradation while still allowing sufficient melting to get an intimate polymer mixture free of any unmelted components. The polymer blend can also be melt filtered using a 40 to 100 micrometer candle or screen filter to remove undesirable black specks or other heterogeneous contaminants, for example any particles having a diameter of greater than 1 micrometer.

In an exemplary process, the various components are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly extruded to form a film. In an embodiment, all of the components are freed from as much water as possible. In addition, compounding is carried out to ensure that the residence time in the machine is short; the temperature is carefully controlled; the friction heat is utilized; and an intimate blend between the components is obtained.

The composition can be extruded using extruders conventionally used for thermoplastic compositions using a flat die. The extrusion cast film method involves the melting of the polymer in an extruder, conveying of the molten polymer through a flat die of small lip gap separation, the stretching of the film at relatively high take-up speeds, and the cooling/solidification of the polymer to form the final film. The extruder may be of the single- or twin-screw design, and a melt pump may also be used to provide a constant, non-pulsating flow of polymer through the die. The die lip gap may be as small as 100 to 200 micron, and the take-up rollers may operate at speeds of up to 200 m/min. The design may also include the addition of a heated roll to temper/anneal the film and thus minimize the occurrence of frozen-in internal stresses. The edges of the film are often trimmed, and the film wound up on a roll using a tension-controlled winding mechanism. In some instances, commercial and/or experimentally functionalized fillers can be uniformly dispersed in the polymer prior to stretching the composite material into a thin film. In these cases, the compounding of the filler into the polymeric matrix to obtain a uniform dispersion can be done on a separate extruder or alternatively, and more preferably, on the same extruder used to effect the melting of the polymer prior to the stretching operation. The accuracy of delivering a constant and uniform flow of molten polymer through the die, the rheological properties of the polymer used to make the film, the cleanliness of both resin and equipment, and the mechanical characteristics of the take-up mechanism will all contribute to the successful preparation of these extruded films having relatively small thicknesses.

In an embodiment, the extrusion cast film method is one-step, scalable to larger size equipment, and does not require the use of any solvent. Even for the case of polymers of high molecular weight and/or high glass transition temperature; this extrusion process can be properly designed to provide an environment for the polymer that does not lead to excessive temperatures that can cause the thermal or mechanical degradation of the material. The use of a filtration device for the melt produces a film that is virtually free of contaminants, such as gels and black specks, which would damage the dielectric performance of these films if not properly removed from the melt. The films produced by this method are thin (10 micron in thickness, and even thinner), of uniform thickness across the web, flat with almost no wrinkles or surface waviness, and relatively free of contamination.

The melted composition can be conveyed through the extruder die using a melt pump. In an embodiment, the film is extruded at temperatures from 250° C. to 500° C., for example 300° C. to 450° C., and the extruded film is uniaxially stretched to produce the dielectric substrate film. Specifically, the components of the film-forming composition are combined, melted, and intimately mixed, then filtered to remove particles greater than 1 micrometer; extruded through a flat die at the foregoing temperatures; and then uniaxially stretched. After stretching, the film can be directly metallized as described below, or wound on a take-up roll for storage or shipping. The film can have a length of at least 10, or 100 to 10,000 meter, and a width of at least 300, or 300 to 3,000 millimeter. The rate which the film can be extruded can vary. In commercial embodiments, the rate at which the film can be extruded varies from 10 lb/hr (4.5 kg/hr) to 1000 lb/hr (450 kg/hr). The rate at which the film can be pulled from the die plate of the extruder (the take-up speed) can range from 10 meter/minute to 300 meter/minute.

The films can be metallized on at least one side thereof. A variety of metals can be used depending on the intended use of the film, for example copper, aluminum, silver, gold, nickel, zinc, titanium, chromium, vanadium, and others. The films are metallized at least on the smooth side, that is, the side having an average surface roughness Ra of less than +/−3% of the average film thickness as determined by optical profilometry. Methods for the metallization of polymer films are known, and include, for example, vacuum metal vapor deposition, metal sputtering, plasma treatments, electron beam treatments, chemical oxidation or reduction reactions, as well as electroless wet-chemical deposition. The films can be metallized on both sides by conventional electroless plating. In another embodiment, a patterned metal layer can be formed on a surface of the film, for example by ink jet printing. The thickness of the metallized layer is determined by the intended use of the metallized film, and can be, for example, 1 Angstrom to 1000 nanometers, 500 nanometer, or 10 nanometer. In an embodiment, the thickness of the metal film can be 1 to 3000 Angstrom, 1 to 2000 Angstrom, or 1 to 1000 Angstrom. If a conductive metal is used, the resistivity of the metal layer on the polymer film can vary from 0.1 to 1000 Ohm per square or 0.1 to 100 Ohm per square.

The surface of the film to be metallized can be pre-treated, for example by washing, flame treatment, plasma discharge corona discharge, or the like, for example to enhance adhesion of the metal layer. One or more additional layers can be deposited on the metal layer, for example a clear coat (such as a poly(methyl methacrylate) or poly(ethyl methacrylate) to provide scratch resistance), or another layer of the polycarbonate film to form a laminate.

The films and metallized films thus produced have a variety of advantageous physical properties. The films have at least one region that is wrinkle-free, that is, sufficiently flat and smooth so that when a surface thereof is metallized, the metallized film has an advantageously consistent surface morphology. In an embodiment, the breakdown strength of the un-metallized film is at least 300 Volt/micrometer, alternatively at least 350 Volt/micrometer, alternatively at least 400 Volt/micrometer. In an embodiment, the breakdown strength of the unmetallized film can be up to 520, 550, 580, 610, 640, 670, and 700 Volt/micrometer.

The flatness of the wrinkle-free regions of the films can be determined by measuring the variation in thickness of the film over a specific area. Here, flat films have variation of the thickness of the film of plus or minus (+/−) 10% or less, alternatively +/−9% or less, +/−8% or less, +/−6% or less, or +/−5%, +/−4%, +/−3%, +/−2%, +/−1% or less, based on the average thickness of the film over the measured area. In an embodiment, the variation in thickness can be as low as +/−1%.

The smoothness of the wrinkle-free regions of a surface of the films can be quantitated by measuring the surface roughness average ("Ra") of the surface by optical profilometery. Here, the wrinkle-free regions of the films have a surface having an Ra of less than +/−3%, less than /−2%, or a low as +/−1% of the average thickness of the film as measured by optical profilometery.

In a particularly advantageous feature, the wrinkle-free regions can be produced over a large area of the film. For example, at least 80%, at least 85%, at least 90%, at least 95%, or at least 97% of area of the film can be wrinkle-free. As such, the films can have wrinkle-free regions having a lower limit and/or an upper limit. The range can include or exclude the lower limit and/or the upper limit. The lower limit and/or upper limit can be selected from 80, 81, 82, 83, 84, 85, 86, 87, 88, 89, 90, 91, 92, 93, 94, 95, 96, 97, 98, 99, and 100% of the area of the film. In another embodiment, the wrinkle-free region can have a contiguous area of at least 1 square meter (m²), at least 2 m², at least 3 m², at least 5 m², at least 10 m², at least 20 m², at least 50 m², or at least 100 m². The large size of the wrinkle-free regions offers a significant manufacturing advantage, in that the metallized films can be manufactured, stored, and shipped in roll form. Thus, the film can have a length of at least 10 meter, and a width of at least 300 millimeter, wherein at least 80%, at least 85%, at least 90%, at least 95%, or at least 97% of area of the film is the wrinkle-free region. In another embodiment, the film has a length of 100 to 10,000 meter, and a width of 300 to 3,000 millimeter, wherein at least 80%, at least 85%, at least 90%, at least 95%, or at least 97% of area of the film is the wrinkle-free region. As such, when the films have a length ranging from 100 to 10,000 meters, the films can have wrinkle-free regions having a lower limit and/or an upper limit. The range can include or exclude the lower limit and/or the upper limit. The lower limit and/or upper limit can be selected from 80, 81, 82, 83, 84, 85, 86, 87, 88, 89, 90, 91, 92, 93, 94, 95, 96, 97, 98, 99, and 100% of the area of the film.

The composition and manufacturing method can be varied to achieve the desired performance properties, in particular electrical properties.

The films can have a high dielectric constant, in particular greater than 2.7, greater than 3.0, or greater than 3.2, 3.3, 3.4, 4.2, 4.3, 4.4, or 4.5, up to 7.0.

The films further can have a dielectric constant that is stable up to the Tg of the polymer that they are made from. Generally, the films are used in environment at a temperature that is lower than the film's polymer's respective Tg, e.g. approximately 20° C. lower. In one embodiment, films further can have a dielectric constant that is stable up to 50° C., up to 60° C., up to 70° C., up to 80° C., up to 90° C., up to 100° C., up to 110° C., up to 120° C. or higher.

The films and the metallized films can be essentially solvent-free, that is, contain less than 1,000 ppm, less than 750 ppm, less than 500 ppm, or less than 250 ppm of a compound having a molecular weight of less than 250 Daltons.

The films and the metallized films can have less than 50 ppm, less than 25 ppm, or less than 10 ppm each of aluminum, calcium, magnesium, iron, nickel, potassium, manganese, molybdenum, sodium, titanium, and zinc in the polycarbonate layer.

The films and the metallized films can have less than 1000 ppm, less than 500 ppm, less than 250 ppm, or less than 100 ppm each of a fluorine-containing compound or a silicone-containing compound.

The films and the metallized films can have no observable specks or gels over an area of at least 3 square meters, or over an area of at least 9 square meters when viewed at a distance of 0.3 meter without magnification.

The films and the metallized films can have no observable voids over an area of at least 3 square meters, or over an area of at least 9 square meters when viewed at a magnification of 50×.

The metallized films can have a dissipation factor, as measured by dielectric spectroscopy, ranging from more than 0 and less than 5%, alternatively more than 0 and less than 4%, alternatively more than 0 and less than 3%, alternatively more than 0 and less than 2%, alternatively more than 0 and less than 1%. In one embodiment, the films have a low dissipation factor, that is, less than 0.1%, or less than 0.08%.

The polycarbonate films can be used in any amorphous film application, but are particularly suitable for metallization. The metallized films can be used in any metallized film application, but are particularly suitable for electrical applications, for example as capacitors or circuit materials. High energy density, high voltage non-polar capacitors can be made using a metalized polymer film that is wound into a cylindrical shape. In a specific embodiment, the polycarbonate film is extruded, then metallized by spraying a conductive metal such as copper or aluminum onto the moving polymer film via vapor deposition in a vacuum chamber, to a thickness from 1 Angstrom to 1000 nanometers, 1 to 3000 Angstrom, or 1 to 1000 Angstrom. The resistivity of the metal on the polymer film can be in a range from about 0.1 Ohm per square to 100 Ohm per square. Before the metallization process is performed, the polymer film can be appropriately masked to provide unmetallized margins at the edges of the width of the film, so that alternate layers of metallized film (when the capacitor is assembled) have unmetallized regions at opposite edges to prevent electrical shorting of the electrodes of the capacitor when the end metallization is ultimately applied.

The capacitors can then be fabricated by rolling two stacked metalized polymer films into a tubular shape. Electrical wires are connected to each metal layer. In a specific embodiment, two separate rolls of the metallized film are placed in a capacitor winder and wound tightly together on a mandrel (which may subsequently be removed) so that the layers are arranged in the sequence polycarbonate/metallized layer/polycarbonate/metallized layer, to replicate a typical construction of a capacitor, i.e., a dielectric with two metallic layers on opposite sides. The two rolls of film are wound with the unmetallized margins on opposite sides.

The extent of winding of the capacitor depends on the physical size of the capacitor desired or on the capacitance desired. Tight winding of the two rolls aids in removing any entrapped air that might otherwise cause premature breakdown. Individual capacitors can be processed in a clean room environment of at least class 100, incorporating HEPA filters, to reduce the likelihood of contamination of the contact point between the dielectric film layers by foreign particles, as well as reducing moisture intake in the dielectric. Electric winding can be used to better maintain uniform tension on each capacitor. The capacitor can then be taped at the edges thereof and strapped in a tray open on both sides, to prevent unwinding of the film layers and to allow the edges or ends of the cylinder to be sprayed with a conductive element, for example with a high zinc content solder followed by a regular softer end spray solder of 90% tin, 10% zinc. The first spray scratches the metallized surface and creates a trough to achieve better contact with the metallization on the dielectric film. The combination of end sprays further aids better contact adhesion with the final termination. Subsequently, conductive, e.g., aluminum leads can then be soldered onto each end to form the final termination. One termination can be spot welded to the bottom of the can, while the other termination can be parallel welded to the lid. The capacitor may be filled with a liquid impregnate (for example, isopropyl phenyl sulfone), in vacuum filling apparatus, and closed.

Other capacitor configurations are possible. For example, the capacitor can have a flat configuration comprising at least a first and a second electrode disposed in a stacked configuration; and the polycarbonate film disposed between and in at least partial contact with each of the first and second electrodes. Additional polycarbonate films and electrode layers can be present in alternating layers. Thus, a multilayer article for forming an electronic device is within the scope of the present claims, comprising a polycarbonate layer/metal layer/dielectric layer, wherein the dielectric layer can be a polycarbonate film as describe herein, or other dielectric material. Additional layers (e.g., additional alternating dielectric/metal layers) can optionally be present.

The following Examples are illustrative, and non-limiting.

EXAMPLES

Materials

The Examples were performed according to the procedures below using the materials identified in Table 1.

Testing Procedures

Film thickness is measured using a Filmetrics F20 Thin Film Measurement System, manufactured by Filmetrics Inc., San Diego, Calif., which employs spectral reflectance to measure a film's thickness by reflecting light off the film and analyzing the reflected light over a range of wavelengths.

Surface roughness is determined using an optical profilometer manufactured by Wyko NT100, operated in the unit's standard operating mode. Measured values are reported under conventional headings such as Ra, Sq, etc., in which "R" indicates that the value was calculated using 2D data and represents linear or profile roughness and "S" indicates that the value was calculated using 3D data and represents surface or area roughness. The second character indicates the formula type used in the calculation, where for example "a" indicates an arithmetic formula and "q" indicates a root mean square formula.

Metal contamination was determined by ICP (Inductively Coupled Plasma Spectroscopy, which is a known method for measuring metal contamination).

Dielectric Constant (DK) and Dissipation Factor (DF) were determined using dielectric spectroscopy. Polymer films with very uniform film thickness are used as the test samples. The film thickness d is precisely determined by micrometers or optical thickness gauges (if the film is transparent). Gold or aluminum electrodes with known area A are deposited on both sides of the film sample using sputtering or thermal evaporation. The metallized sample is then loaded into a temperature-controlled chamber and electrically connected with a dielectric spectrum analyzer, such as the Novocontrol Broadband Dielectric Spectrometers. The spectrum analyzer measures the capacitance C and the dissipation factor DF. The DK of the sample is calculated based on the measured capacitance and the area and thickness of the sample $$DK = \frac{Cd}{A\varepsilon_0}, \text{ where } \varepsilon_0 = 8.85 \times 10^{-12} \text{ F/m},$$

the vacuum permittivity constant.

Dielectric breakdown was determined in accordance with ASTM D-149. A piece of polymer film with uniform thickness is used as the test sample and the thickness is measured using the same method as for the DK and DF measurement. The film sample is tested as a bare film without electrodes deposited on its surface. The film sample is placed between two metal electrodes, where the bottom electrode is a flat copper plate and the top electrode is a stainless steel ball with ¼ inch diameter. During the breakdown measurement, a continuously increasing DC voltage is applied on the sample between the two electrodes, starting from 0V and increasing with a fixed rate of 500 V/sec. The DC voltage is applied using a high voltage power supply, such as the Hipotronics DC Power Supply. The voltage increases until dielectric breakdown occurs, which generates large current and causes the power supply to automatically reset through its protection circuits. The highest reached voltage is recorded as the breakdown voltage $V_{BD}$, and the breakdown electric field $E_{BD}$ is determined by dividing $V_{BD}$ by the film thickness d. This method was employed unless another method is identified.

Insulation resistance is measured by a megohm meter with a time tested function, temperature meter, and similar features.

Compression Molding Procedure—Approximately 1.5 grams of powder or pellets were weighed into a 20 ml vial and covered with a Kim wipe and rubber band. This was dried in a vacuum oven overnight at 80° C. The next day the vacuum was removed and nitrogen if used to fill the vacuum oven. Samples were removed quickly and the vial was capped. The resulting dry, capped samples were held for at least 4-8 hours. A 4×5 inch (101 mm×127 mm) ferro-plate was placed on a larger steel plate. Three shims that are 2 inches (101 mm) long and of the desired sample thickness were placed on the ferro-plate in such a manner to form 3 sides of a square. When ready to mold, individual samples were quickly poured into the center, and another ferro-plate and steel plate was placed on top. This entire stack was placed into an automated press such as a Tetrahedron press. The initial temperature setting was 512° F. (270° C.) and the platen was raised just enough to lift the upper platen, but not enough to engage the hydraulics. After 3 minutes of equilibration, the platen was raised to engage the automated press and the pressure rapidly rose to 15,000 lbs (6,804 kg) and was held there for 5 minutes at this temperature and pressure. The press then automatically cooled to 212° F. (100° C.) while maintaining the 15,000 lbs (6,804 kg) of pressure and held at the final temperature for 5 minutes. Once the press released at the end, the sample was quickly removed and the plates were pulled away from the sample while still warm. If a sample remained stuck to the plates, they were soaked in water for a period of time to allow easy release.

This procedure was used for materials with Tg's of approximately 180° C. For polycarbonates that have Tg's in the 145° C.-150° C. range, the initial and final temperatures of the press were each reduced by 20° C. It was observed that hazy films were produced if the final temperatures were in the 200° C.-220° C., apparently from crystallization in the melt. Film thicknesses typically ranged from 225-275 µm depending on the Tg of material. If low bulk density powders produced bubbles following this procedure, the samples were cold pressed first. The 1.5 grams of powder was placed in a 1 inch (25.4 mm) diameter mold and Carver pressed to form a coin-like disk. This could then be dried overnight in the same manner and used to make films. Finally, film thicknesses could be adjusted by using different thickness shims.

TABLE 1

| Material | Trade Name | Source |
| --- | --- | --- |
| Polycarbonate 1 (PC1) | Lexan 135 Resin | SABIC Innovative Plastics |
| Polycarbonate 2 (PC2) | APEC PMR-00039808 Resin | Bayer |
| Polycarbonate 3 (PC3) | Lexan XHT 4141 Resin | SABIC Innovative Plastics |
| Polycarbonate 4 (PC4) | Lexan 151 Resin | SABIC Innovative Plastics |
| Polycarbonate 5 (PC5) | Lexan ML5221 Resin | SABIC Innovative Plastics |
| Polyetherimide (PEI) | Ultem 1000 Resin | SABIC Innovative Plastics |
| Copolycarbonate 1 (CPC1) | Lexan Resin | SABIC Innovative Plastics |
| Branched polycarbonate 2 (CPC2) | Lexan Resin | SABIC Innovative Plastics |
| Copolyestercarbonate 3 (CPC3) | Lexan Resin | SABIC Innovative Plastics |
| Copolyestercarbonate 4 (CPC4) | Lexan Resin | SABIC Innovative Plastics |
| Copolyestercarbonate 5 (CPC5) | Lexan Resin | SABIC Innovative Plastics |
| Copolyestercarbonate 6 (CPC6) | Lexan Resin | SABIC Innovative Plastics |

Comparative Example 1

Two polycarbonate resins of different glass transition temperatures, PC1 (a bisphenol A-based polycarbonate) and PC2, were extruded into thin films, and their dielectric breakdown strengths evaluated. The results are presented in Table 2.

TABLE 2

|  | Comp. Ex. 1A | | Comp. Ex. 1B | | Comp. Ex. 1C | | Comp. Ex. 1D | |
| --- | --- | --- | --- | --- | --- | --- | --- | --- |
| Die size (in/mm) | 3/76.2 | | 3/76.2 | | 3/76.2 | | 3/76.2 | |
| Die gap (in/micron) | 0.005/125 | | 0.005/125 | | 0.005/125 | | 0.005/125 | |
| Screw design | Standard, Low Mixing | | Standard, Low mixing | | Standard, Low mixing | | Standard, Low mixing | |
| Material | PC1 | | PC1 | | PC2 | | PC2 | |
| Melt Temperature (° C.) | 311 | | | | | | | |
| Extruder Barrel Temperature | Set | Actual | Set | Actual | Set | Actual | Set | Actual |
| Die head T (° C.) | 320 | 316 | | | 340 | | 340 | |
| Die adaptor T (° C.) | 320 | 316 | | | 340 | | 340 | |
| Adaptor T (° C.) | 320 | 320 | | | 340 | | 340 | |
| Extruder Front T (° C.) | 310 | 310 | | | 340 | | 340 | |
| Extruder Middle T (° C.) | 300 | 301 | | | 340 | | 340 | |
| Extruder Middle T (° C.) | 280 | 280 | | | 340 | | 340 | |
| Extruder Back T (° C.) | 260 | 259 | | | 320 | | 320 | |
| Screw speed (rpm) | 200 | | | | 200 | | 200 | |
| Torque (%/Nm) | 43/11.2 | | 35/9.4 | | 30/8.6 | | 30/8.6 | |
| Die pressure (psi)/(MPa) | 745/5.13 | | 560/3.86 | | 600/4.13 | | 420/2.89 | |
| Throughput (set) (lb/hr)/(kg/hr) | 0.5/0.227 | | 0.25/0.114 | | 0.5/0.227 | | 0.25/0.114 | |
| Throughput (actual) (lb/hr)/(kg/hr) | 0.4822/0.219 | | 0.2441/0.111 | | 0.4822/0.219 | | 0.2441/0.111 | |
| Roll speed actual (ft/min)/(m/min) | 11.4/3.47 | | 11.4/3.47 | | 11.4/3.47 | | 11.4/3.47 | |
| Forced air to cool film @ die exit | Yes | | Yes | | Yes | | Yes | |
| Film thickness (micron) Mean St dev/#samples | 8.9/0.5/20 | | 4.9/0.6/20 | | 10.3/1.4/20 | | 5.4/0.7/20 | |
| Breakdown strength (V/micron) Mean/St dev/#samples | 804/99/20 | | 818/93/20 | | 838/121/20 | | 787/151/20 | |

Discussion: Table 2 shows that films of PC1 (Tg=152° C.) and PC2 (Tg=204° C.) of less than 7 micron in thickness and dielectric breakdown strengths higher than about 750 V/micron can be made by melt extrusion. These films were made at polymer rates equal to 0.25 lb/hr, and take-up speed equal to 11.4 ft/min. Since these films showed wrinkles, die lines and other imperfections, they did not have the level of quality that is required for the manufacture of electrostatic film capacitors.

Comparative Example 2

Table 3 shows the film thicknesses and dielectric breakdown strengths of films made by extrusion from PC3 having a glass transition temperature equal to 181.5° C.

TABLE 3

|  | Comp. Ex. 2A | Comp. Ex. 2B | Comp. Ex. 2C | Comp. Ex. 2D | Comp. Ex. 2E |
|---|---|---|---|---|---|
| Material | PC3 | PC3 | PC3 | PC3 | PC3 |
| Die size (in)/(mm) | 3/76.2 | 3/76.2 | 3/76.2 | 3/76.2 | 3/76.2 |
| Die gap (in/micron) | 0.005/125 | 0.005/125 | 0.005/125 | 0.005/125 | 0.005/125 |
| Screw design | Standard, Low mixing | Standard, Low mixing | Standard, Low mixing | Standard, Low mixing | Standard, Low mixing |
| Melt Temperature (° C.) | ~315 | | | | |

| Extruder Barrel Temperature | Set | Actual | Set | Actual | Set | Actual | Set | Actual | Set | Actual |
|---|---|---|---|---|---|---|---|---|---|---|
| Die head T (° C.) | 320 | 315 | 320 | | | | | | 330 | |
| Die adapter T (° C.) | 320 | | 320 | | | | | | 330 | |
| Adapter T (° C.) | 320 | | 320 | | | | | | 320 | |
| Extruder Front T (° C.) | 320 | | 320 | | | | | | 320 | |
| Extruder Middle T (° C.) | 320 | | 320 | | | | | | 320 | |
| Extruder Middle T (° C.) | 300 | | 300 | | | | | | 300 | |
| Extruder Back T (° C.) | 280 | | 280 | | | | | | 280 | |

|  | | | | | |
|---|---|---|---|---|---|
| Screw speed (rpm) | 250 | 250 | 250 | 250 | 250 |
| Torque (%/Nm) | 37/10.4 | 37/10.2 | | 30/8.2 | 25/7.8 |
| Die pressure (psi)/(MPa) | ~820/5.65 | 810/5.58 | 750/5.17 | 675/4.65 | 500/3.45 |
| Throughput (set) (lb/hr)/(kg/hr) | 0.5/0.227 | 0.5/0.227 | 0.5/0.227 | 0.4/0.182 | 0.4/0.182 |
| Roll speed actual (ft/min)/(m/min) | 7.6/2.32 | 11.4/3.47 | 15.2/4.63 | 15.2/4.63 | 17.1/5.21 |
| Film width (in)/(mm) | About 2.5/63.5 | About 2.5/63.5 | | | |
| Forced air to cool film @ die exit | Yes/8 psi | Yes | Yes | Yes | Yes |
| Film thickness (micron) Mean/St dev/#samples | 13.7/1.2/20 | 10.7/1.6/20 | 7.5/1.3/20 | 6.0/1.1/20 | 4.4/0.8/20 |
| Breakdown strength (V/micron) Mean/St dev/#samples | 698/93/20 | 710/119/20 | 629/131/20 | 713/136/20 | 706/121/20 |

Discussion: Although these films had a relatively high breakdown strength, the presence of wrinkles, die lines and other imperfections made them unsuitable for the manufacture of electrostatic film capacitors.

Example 1

Table 4 shows the thickness distribution across the web of a film of PC4 about 6 micrometers thick, about 45 in wide and about 6,000 ft long.

TABLE 4

| Measurement # | Film Thickness (μm) | Distance from left edge (in)/(mm) |
|---|---|---|
| 1 | 7.4171 | 2/51 |
| 2 | 6.1876 | 4/102 |
| 3 | 6.5986 | 6/152 |
| 4 | 5.6736 | 8/203 |
| 5 | 6.3265 | 10/254 |
| 6 | 6.0949 | 12/305 |
| 7 | 6.0564 | 14/355 |
| 8 | 6.0961 | 16/406 |
| 9 | 5.4231 | 18/457 |
| 10 | 6.3784 | 20/508 |
| 11 | 5.4621 | 22/558 |
| 12 | 6.1343 | 24/610 |
| 13 | 5.2897 | 26/660 |
| 14 | 6.6928 | 28/711 |
| 15 | 6.0192 | 30/762 |
| 16 | 5.7591 | 32/813 |
| 17 | 5.6524 | 34/864 |
| 18 | 5.8041 | 36/914 |
| 19 | 5.4151 | 38/965 |
| 20 | 5.8695 | 40/1016 |
| 21 | 5.2719 | 42/1067 |
| 22 | 5.935 | 44/1118 |
| AVERAGE | 5.98 | |
| ST DEV | 0.51 | |
| % Error | 9 | |

These results showed that 22 measurements of the film thickness across the web gathered around the mean value of 5.98 micron with one standard deviation of only 0.51 micron.

Table 5 shows the dielectric breakdown strength of the film of PC4 for which thickness measurements were recorded on Table 4.

TABLE 5

| Site | Thickness (micron) | Breakdown Voltage (kVDC) | Breakdown Strength (C/micron) |
|---|---|---|---|
| 1 | 5.56 | 3.79 | 682 |
| 2 | 5.56 | 3.79 | 682 |
| 3 | 5.61 | 3.74 | 667 |
| 4 | 5.60 | 4.34 | 775 |
| 5 | 5.71 | 4.37 | 765 |
| 6 | 5.72 | 4.13 | 722 |
| 7 | 5.83 | 4.35 | 746 |
| 8 | 5.91 | 4.39 | 743 |
| 9 | 5.90 | 3.81 | 646 |
| 10 | 5.95 | 4.39 | 738 |
| 11 | 5.99 | 3.22 | 538 |
| 12 | 6.03 | 4.39 | 728 |
| 13 | 6.05 | 4.54 | 750 |
| 14 | 6.08 | 4.86 | 799 |
| 15 | 6.22 | 4.64 | 746 |
| 16 | 6.24 | 3.93 | 630 |
| 17 | 6.30 | 4.45 | 706 |
| 18 | 6.33 | 4.38 | 692 |
| 19 | 6.35 | 4.87 | 767 |
| 20 | 6.35 | 4.40 | 693 |
| Mean | 6.0 | 4.24 | 711 |
| StDev | 0.28 | 0.41 | 60 |

Discussion: These results showed that the film of PC4 had a breakdown strength in excess of 700 V/micron with a standard deviation of only 60 V/micron and failed at an average voltage of about 4,240 VDC.

Table 6 shows the surface roughness (Ra) of the two sides of the same film of PC4 as measured by Optical Profilometry.

TABLE 6

| Sample | Ra (um) | Rq (um) |
|---|---|---|
| Side 1 | 0.0126 | 0.0161 |
|  | 0.0142 | 0.0185 |
|  | 0.0132 | 0.0169 |
|  | 0.0187 | 0.0238 |
|  | 0.0182 | 0.0229 |
|  | 0.0154 | 0.0191 |
| average | 0.0154 | 0.0196 |
| stdev | 0.0026 | 0.0031 |
| Side 2 | 0.0109 | 0.0140 |
|  | 0.0108 | 0.0149 |
|  | 0.0097 | 0.0125 |
|  | 0.0104 | 0.0138 |
|  | 0.0100 | 0.0127 |
|  | 0.0133 | 0.0171 |
| average | 0.0108 | 0.0142 |
| stdev | 0.0013 | 0.0017 |

These results showed that the average roughness values were about 15 and 11 nm for both sides, which were below the 180 nm allowed by the specification for the manufacture of electrostatic metallized film capacitors (less than about 3% of the average film thickness).

Elemental analysis by Inductively Coupled Plasma Mass Spectroscopy was performed on several films of polycarbonate and polyetherimide made by the extrusion method. Table 7 below shows that the amounts of metals found in these films were within the acceptable ranges allowed by the specification for the manufacture of metallized film capacitors.

TABLE 7

| ICP - Results in µg/g (ppm). | | | | | | |
|---|---|---|---|---|---|---|
| Sample Name | Al, µg/g ± 95% CI | Ca, µg/g ± 95% CI | Mg, µg/g ± 95% CI | Ni, µg/g ± 95% CI | Na, µg/g ± 95% CI | Fe, µg/g ± 95% CI |
| PC5 | 5.7 ± 0.2 | 57 ± 0.3 | 2.1 ± 0.1 | 11.3 ± 0.5 | 2.4 ± 0.1 | 28.0 ± 0.5 |
|  | 2.3 ± 0.1 | 204 ± 0.5 | 1.2 ± 0.1 | 10.5 ± 0.4 | 3.8 ± 0.1 | 22.9 ± 0.3 |
|  | 2.5 ± 0.1 | 198 ± 0.5 | 0.9 ± 0.1 | 9.3 ± 0.4 | 6.1 ± 0.1 | 33.8 ± 0.3 |
| PEI8.5 | 2.9 ± 0.2 | 81 ± 0.3 | 1.0 ± 0.1 | 35.1 ± 0.5 | 10.3 ± 0.1 | 108 ± 0.6 |
|  | 2.9 ± 0.1 | 88 ± 0.3 | 0.8 ± 0.1 | 31.8 ± 0.5 | 12.0 ± 0.1 | 136 ± 0.7 |
| PEI7.2 | 3.7 ± 0.2 | 57 ± 0.3 | 1.2 ± 0.1 | 29.2 ± 0.6 | 13.7 ± 0.1 | 142 ± 0.8 |
|  | 3.6 ± 0.2 | 47 ± 0.3 | 1.0 ± 0.1 | 36.1 ± 0.6 | 12.6 ± 0.1 | 141 ± 0.8 |
| PC4 | 3.1 ± 0.1 | 33 ± 0.2 | 1.0 ± 0.1 | 23.9 ± 0.3 | 2.0 ± 0.1 | 24 > X > 0.7 |
|  | 2.3 ± 0.1 | 32 ± 0.2 | 0.7 ± 0.1 | 18.2 ± 0.3 | 2.0 ± 0.1 | 24 > X > 0.7 |
|  | 2.9 ± 0.1 | 40 ± 0.2 | 0.8 ± 0.1 | 9.1 ± 0.3 | 2.5 ± 0.1 | 24 > X > 0.7 |
| Sample Name | Ti, µg/g ± 95% CI | Cr*, µg/g ± 95% CI | Cu*, µg/g ± 95% CI | Zn, µg/g ± 95% CI | K, µg/g ± 95% CI | Mn, µg/g ± 95% CI | Mo, µg/g ± 95% CI |
| PC5 | 1.2 ± 0.1 | 3.3 ± 0.3 | 3.3 ± 0.5 | 5.7 ± 0.3 | 1.7 ± 0.3 | 0.4 ± 0.1 | 1.1 > X > 0.3 |
|  | 0.4 ± 0.1 | 3.3 ± 0.3 | 2.7 ± 0.5 | 16.9 ± 0.3 | 3.3 ± 0.2 | 0.4 ± 0.1 | 1.1 > X > 0.3 |
|  | 0.5 ± 0.1 | 4.9 ± 0.3 | 3.5 ± 0.5 | 17.4 ± 0.3 | 5.4 ± 0.2 | 0.6 ± 0.1 | 1.1 > X > 0.3 |
| PEI8.5 | 0.4 ± 0.1 | 191 ± 0.5 | 2.2 > X > 1.0 | 9.5 ± 0.3 | 1.8 ± 0.3 | 2.5 ± 0.1 | 1.1 > X > 0.3 |
|  | 0.3 ± 0.1 | 257 ± 0.5 | 2.3 ± 0.5 | 11.5 ± 0.3 | 2.2 ± 0.3 | 3.1 ± 0.1 | 1.1 ± 0.3 |
| PEI7.2 | .03 ± 0.1 | 206 ± 0.5 | 2.6 ± 0.5 | 7.8 ± 0.3 | 2.3 ± 0.3 | 3.3 ± 0.1 | 1.1 ± 0.3 |
|  | 0.3 ± 0.1 | 213 ± 0.5 | 2.6 ± 0.5 | 10.9 ± 0.3 | 1.7 ± 0.3 | 3.2 ± 0.1 | 1.2 ± 0.3 |
| PC4 | 0.4 ± 0.1 | 1.6 ± 0.3 | <1 | 5.6 ± 0.3 | 1.3 > X > 0.4 | <0.2 | 1.1 > X > 0.3 |
|  | 0.3 ± 0.1 | 1.3 ± 0.1 | <1 | 6.6 ± 0.3 | 1.3 > X > 0.4 | <0.2 | <0.3 |
|  | 0.4 ± 0.1 | 1.2 > X > 0.4 | <1 | 7.1 ± 0.3 | 1.3 > X > 0.4 | <0.2 | <0.3 |

PC5, made on lab PRISM extrusion line, 0.5 lb/hr, 5.4 ft/min, ~25 micron
PEI8.5, made on lab PRISM extrusion line, 0.4 lb/hr, 9 ft/min, 8.5 micron, 475 V/micron
PEI7.2, ULTEM 1000, PRISM extrusion line, 0.3 lb/hr, 9 ft/min, 7.2 micron, 553 V/micron
PC4, extruded 6 micron film, 711 V/micron.
*Cr and especially Cu could be partially lost after ashing, thus their results are for information only.

Results indicate that some impurities are not uniformly distributed in the samples. For the case of the PC4 polycarbonate film, which is the same film described in Table 4 above, these results were consistent with the relatively high values of dielectric breakdown strength measured in this same film (Table 5 above).

Example 2

The film of PC4 described in Table 4 was metallized and wound into electrostatic film capacitors of about 13.5 microF. Two roll pairs of extruded polycarbonate film were metalized with zinc heavy edge and aluminum web electrodes. The Rolls were marked in pairs as #3 & #4 and #2 & #5. The film in both roll pairs was 6 micron thick and 100 mm wide. A series of capacitors were automatically wound from each roll pair set.

Measurement of Breakdown Voltage: Two capacitors from each roll pair set (units #1 and #5) were ramped in 50 VDC steps, 90 seconds per step, until the unit short circuited as monitored by Insulation Resistance using 500 megohm (or less) as the failure (breakdown point). The results are reported on Tables 8 and 9.

TABLE 8

Breakdown Test Results Unit #1

| S/N | Break-Down Test (VDC) | Break-Down Test (VDC) |
|---|---|---|
| 1 | 900 | 850 |

| Voltage VDC | Rolls #2 & #5 IR (MΩ) | Rolls #3 & #4 IR (MΩ) |
|---|---|---|
| 50 | 6,250 | 6,250 |
| 100 | 11,111 | 11,111 |
| 150 | 10,714 | 9,375 |
| 200 | 11,765 | 11,765 |
| 250 | 10,870 | 10,870 |
| 300 | 9,677 | 9,677 |
| 350 | 8,750 | 13,462 |
| 400 | 11,111 | 11,111 |
| 450 | 9,783 | 10,000 |
| 500 | 8,065 | 8,065 |
| 550 | 6,250 | 7,237 |
| 600 | 4,615 | 6,316 |
| 650 | 3,611 | 5,417 |
| 700 | 2,593 | 4,118 |
| 750 | 1,923 | 3,216 |
| 800 | 1,379 | 2,105 |
| 850 | 988 | 2 |
| 900 | 30 | n/a |

TABLE 9

Breakdown Test Results Unit #5

| S/N | Break-Down Test (VDC) | Break-Down Test (VDC) |
|---|---|---|
| 5 | 850 | 900 |

| Voltage VDC | Rolls #2 & #5 IR (MΩ) | Rolls #3 & #4 IR (MΩ) |
|---|---|---|
| 50 | 16,666 | 16,666 |
| 100 | 16,666 | 14,285 |
| 150 | 21,428 | 16,666 |
| 200 | 22,222 | 16,666 |
| 250 | 22,727 | 17,857 |
| 300 | 23,076 | 15,000 |
| 350 | 20,588 | 15,909 |
| 400 | 20,000 | 15,384 |
| 450 | 15,517 | 11,842 |
| 500 | 11,627 | 10,204 |
| 550 | 9,322 | 7,857 |
| 600 | 7,058 | 6,382 |
| 650 | 5,327 | 5,200 |
| 700 | 3,846 | 3,977 |
| 750 | 2,788 | 2,952 |
| 800 | 1,550 | 2,156 |
| 850 | 220 | 1,534 |
| 900 | n/a | 78 |

Tables 8 and 9 show that the breakdown voltage of these capacitors was between 850 V and 900 V.

Insulation Resistance with Voltage: Typically, based on historical ratings, 6 micron thick PC film is rated at 200 VDC with a DWV requirement of 400 VDC. Three other 13.5 microF capacitors were tested for dielectric withstanding voltage (DWV) and measured for insulation resistance at 400 VDC DWV/200 VDC IR; 600 VDC DWV/300 VDC IR; and 800 VDC DWV/400 VDC IR to compare the extruded PC film performance to typical solvent cast PC results (Table 10).

TABLE 10

Breakdown Test Results Insulation Resistance vs Voltage.

| Unit S/N | Rolls #2 & #5 Break-Down Test (VDC) | Rolls #3 & #4 Break-Down Test (VDC) |
|---|---|---|
| 1 | 900 | 850 |

| Unit S/N | IR AT (VDC) | Rolls #2 & #5 IR (MΩ) | Rolls #3 & #4 IR (MΩ) |
|---|---|---|---|
| 2 | 200 | 66,700 | 66,700 |
| 3 | 300 | 13,600 | 10,700 |
| 4 | 400 | 1,000 | 400 |

Insulation Resistance with Temperature: Units #2, 3 and 4 from each of the two groups were measured for Insulation Resistance at +25° C., +85° C., +105° C. and +125° C., and three different voltages, 200 VDC, 300 VDC and 400 VDC (Table 11A, 11B and 11C)

TABLE 11A

Temperature Effects on IR (MΩ) at 200 VDC

| Rolls Section S/N4 | Temperature (° C.) 25 | Temperature (° C.) 85 | Temperature (° C.) 105 | Temperature (° C.) 125 |
|---|---|---|---|---|
| Rolls #2 & #5 | 64,500 | 7,200 | 4,200 | 1,900 |
| Rolls #3 & #4 | 69,000 | 9,600 | 6,700 | 4,900 |

TABLE 11B

Temperature Effects on IR (MΩ) at 300 VDC

| Rolls Section S/N3 | Temperature (° C.) 25 | Temperature (° C.) 85 | Temperature (° C.) 105 | Temperature (° C.) 125 |
|---|---|---|---|---|
| Rolls #2 & #5 | 77,000 | 4,800 | 3,100 | 1,700 |
| Rolls #3 & #4 | 79,000 | 8,500 | 5,400 | 4,100 |

TABLE 11C

Temperature Effects on IR (MΩ) at 400 VDC

| Rolls Section S/N2 | Temperature (°C.) 25 | Temperature (°C.) 85 | Temperature (°C.) 105 | Temperature (°C.) 125 |
|---|---|---|---|---|
| Rolls #2 & #5 | Shorted | N/A | N/A | N/A |
| Rolls #3 & #4 | 57,000 | 5,900 | 4,900 | 2,100 |

The purpose of the following Examples is to demonstrate the performance of copolycarbonates, polycarbonates, and copolyestercarbonates. A copolycarbonate (CPC1), branched polycarbonate (CPC2), and copolyestercarbonates, designated CPC3, CPC4, CPC5, and CPC6, were used in the following examples. Further details on the composition of these copolymers are provided in Table 1 above, in the following discussion, and in Table 12, below.

CPC1 is a copolycarbonate of 67 mole % Bisphenol A and 33 mole % 3,3-bis(4-hydroxyphenyl)-2-phenylisoindolin-1-one.

CPC2 is a branched Bisphenol A polycarbonate with hydroxybenzonitrile endgroups.

CPC3 is a polyestercarbonate with about 19 mole % resorcinol, an iso and tere (1:1) phthalate ester linkages, 6 mole % resorcinol carbonate linkages and about 75 mole % BPA carbonate linkages. Mw~30,000.

CPC4 is a copolycarbonate with about 80 mole % resorcinol iso and tere (1:1) phthalate ester linkages, 10 mole % resorcinol carbonate linkages and about 10 mole % BPA carbonate linkages. Mw~21,000

CPC5 is a BPA copolyester carbonate containing about 80 mole % of a 93:7 mixture iso and tere phthalate ester groups and the remainder BPA carbonate groups, Mw~28,000.

CPC6 is a BPA copolyester carbonate containing about 60 mole % of a 50:50 mixture iso and tere phthalate ester groups and the remainder BPA carbonate groups.

TABLE 12

| Copolyestercarbonate | % Ester | Isophthalic/Terephthalic ratio | Phenol |
|---|---|---|---|
| CPC 3 | 90 | 50/50 | Resorcinol |
| CPC 4 | 20 | 50/50 | Resorcinol |
| CPC 5 | 80 | 93/7 | Bisphenol A |
| CPC 6 | 60 | 50/50 | Bisphenol A |

Samples of these materials were evaluated according to the testing procedures summarized above, and the results are reported on Table 13.

TABLE 13

| Polymer | Breakdown strength/std dev (V/micron) | Dielectric constant(*) | Dissipation Factor (%)(*) | Energy Density (J/cc) | Glass Transition Temp (° C.) |
|---|---|---|---|---|---|
| PC1 | 804/99 | 3.05 | 0.35 | 8.7 | 152 |
| CPC1 | 738/178 | 3.23 | 0.71 | 7.8 | 196 |
| CPC2 | 801/165 | 3.2 | 0.33 | 9.1 | 140 |
| CPC3 | 636/75 | 3.5 | 0.82 | 6.3 | 136 |
| CPC4 | 660/95 | 3.3 | 0.65 | 6.4 | 141 |
| CPC5 | 766/149 | 3.55 | 0.96 | 9.2 | 177 |
| CPC6 | 692/149 | 3.22 | 0.37 | 6.8 | 171 |

(***)These tests were conducted on compression molded samples prepared as described in the procedure above.

The copolycarbonate, branched polycarbonate, and copolyestercarbonates demonstrated high average values for Breakdown Strength (~650-800 V/micron). The Dielectric Constant values for the copolycarbonate, branched polycarbonate, and copolyestercarbonates were uniformly equal to or better than PC1, a polycarbonate evaluated above. Copolycarbonate CPC1 and two copolyestercarbonates, CPC5 and CPC6, demonstrated excellent overall performance on the electrical properties and exhibited high Tg values and were further evaluated for film properties, below.

Surface Roughness of Extrusion Films—Films of CPC1, CPC5, and CPC6 were evaluated as described in the procedure above, and the results are shown on Table 14a, and 14b, below, in which the values reported are in microns.

TABLE 14a

| Film | Side 1 Ra | | Side 2 Ra | | Side 1 + Side 2 Ra | |
|---|---|---|---|---|---|---|
| CPC5 | 0.0266 | 0.0056 | 0.0490 | 0.0011 | 0.0378 | 0.0128 |
| CPC6 | 0.0117 | 0.0037 | 0.0173 | 0.0082 | 0.0145 | 0.0065 |
| CPC1 | 0.0056 | 0.0005 | 0.0089 | 0.0043 | 0.0073 | 0.0033 |

TABLE 14b

| Film | Side 1 Rq | | Side 2 Rq | | Side 1 + Side 2 Rq | |
|---|---|---|---|---|---|---|
| CPC5 | 0.0346 | 0.0070 | 0.0707 | 0.0054 | 0.0526 | 0.0346 |
| CPC6 | 0.0164 | 0.0061 | 0.0224 | 0.0100 | 0.0194 | 0.0164 |
| CPC1 | 0.0077 | 0.0012 | 0.0112 | 0.0054 | 0.0095 | 0.0077 |

These results showed that the average roughness values were under 0.04 microns for both sides.

Table 15 shows the dielectric breakdown strength of the film of CPC1 at 20 sites on the film.

TABLE 15

| Site | Thickness (micron) | Breakdown Voltage (k-VDC) | Breakdown Strength (V/micron) |
| --- | --- | --- | --- |
| 1 | 11.5 | 12.44 | 1081 |
| 2 | 11.5 | 10.09 | 874 |
| 3 | 12.3 | 10.55 | 857 |
| 4 | 10.3 | 9.25 | 898 |
| 5 | 11.4 | 10.54 | 925 |
| 6 | 9.50 | 8.65 | 911 |
| 7 | 9.13 | 6.72 | 736 |
| 8 | 7.42 | 7.62 | 1027 |
| 9 | 7.81 | 7.15 | 916 |
| 10 | 7.79 | 7.46 | 957 |
| 11 | 8.91 | 6.74 | 756 |
| 12 | 11.1 | 8.03 | 721 |
| 13 | 10.0 | 8.63 | 860 |
| 14 | 8.83 | 9.83 | 1113 |
| 15 | 8.51 | 8.00 | 941 |
| 16 | 9.06 | 8.02 | 885 |
| 17 | 12.4 | 11.19 | 902 |
| 18 | 11.5 | 11.56 | 1004 |
| 19 | 10.8 | 10.51 | 973 |
| 20 | 10.0 | 10.37 | 1036 |
| Mean | 10.00 | 9.17 | 919 |
| StDev | 1.54 | 1.70 | 106 |

These results showed that the film of CPC1 had an average breakdown strength in excess of 900 V/micron with a standard deviation of 106 V/micron and failed at an average voltage of about 9,170 VDC.

Table 16 shows the dielectric breakdown strength of the film of CPC5 at 20 sites on the film.

TABLE 16

| Site | Thickness (micron) | Breakdown Voltage (k-VDC) | Breakdown Strength (V/micron) |
| --- | --- | --- | --- |
| 1 | 10.7 | 11.85 | 1107 |
| 2 | 10.9 | 10.06 | 927 |
| 3 | 11.2 | 10.56 | 945 |
| 4 | 10.6 | 11.19 | 1061 |
| 5 | 8.30 | 9.27 | 1117 |
| 6 | 10.7 | 6.73 | 627 |
| 7 | 7.36 | 9.18 | 1247 |
| 8 | 9.16 | 9.27 | 1012 |
| 9 | 9.30 | 8.03 | 864 |
| 10 | 10.5 | 7.85 | 748 |
| 11 | 13.9 | 10.49 | 753 |
| 12 | 8.08 | 8.63 | 1068 |
| 13 | 8.82 | 8.64 | 980 |
| 14 | 9.15 | 7.12 | 778 |
| 15 | 8.17 | 8.58 | 1050 |
| 16 | 9.99 | 12.46 | 1248 |
| 17 | 13.5 | 10.46 | 777 |
| 18 | 9.70 | 9.27 | 956 |
| 19 | 10.0 | 10.54 | 1052 |
| 20 | 10.4 | 8.01 | 773 |
| Mean | 10.01 | 9.41 | 955 |
| StDev | 1.65 | 1.53 | 172 |

These results showed that the film of CPC5 had an average breakdown strength in excess of 900 V/micron with a standard deviation of 172 V/micron and failed at an average voltage of about 9,410 VDC.

Table 17 shows the dielectric breakdown strength of the film of CPC6 at 20 sites on the film.

TABLE 17

| Site | Thickness (micron) | Breakdown Voltage (k-VDC) | Breakdown Strength (V/micron) |
| --- | --- | --- | --- |
| 1 | 7.16 | 6.08 | 849 |
| 2 | 9.77 | 8.61 | 881 |
| 3 | 11.1 | 9.24 | 834 |
| 4 | 10.3 | 8.54 | 829 |
| 5 | 8.00 | 7.39 | 924 |
| 6 | 8.43 | 6.73 | 798 |
| 7 | 10.3 | 10.52 | 1022 |
| 8 | 11.1 | 9.24 | 832 |
| 9 | 12.7 | 11.28 | 891 |
| 10 | 15.0 | 15.16 | 1009 |
| 11 | 15.6 | 15.68 | 1008 |
| 12 | 15.0 | 13.09 | 873 |
| 13 | 16.1 | 13.08 | 811 |
| 14 | 14.0 | 6.75 | 484 |
| 15 | 11.2 | 10.53 | 939 |
| 16 | 9.50 | 8.63 | 908 |
| 17 | 7.67 | 6.71 | 875 |
| 18 | 9.20 | 5.41 | 588 |
| 19 | 8.26 | 6.15 | 744 |
| 20 | 10.4 | 8.31 | 796 |
| Mean | 11.04 | 9.36 | 845 |
| StDev | 2.79 | 3.01 | 130 |

These results showed that the film of CPC6 had an average breakdown strength in excess of 840 V/micron with a standard deviation of 130 V/micron and failed at an average voltage of about 9,360 VDC. Advantageously, films made in accordance to our invention exhibited a thickness of more than 0 and less than 7 micrometers, a variation of the thickness of the film of +/−10% or less of the thickness of the film, a surface roughness average of less than +/−3% of the average thickness of the film as measured by optical profilometry; a dielectric constant at 1 kHz and room temperature of at least 2.7; a dissipation factor at 1 kHz and room temperature of 1% or less; and a breakdown strength of at least 300 Volt/micrometer.

All cited patents, patent applications, and other references are incorporated herein by reference in their entirety.

Although the present invention has been described in detail with reference to certain preferred versions thereof, other variations are possible. Therefore, the spirit and scope of the appended claims should not be limited to the description of the versions contained therein.

What is claimed is:

1. A film comprising a copolycarbonate, wherein the film is a uniaxially-stretched, extruded film comprising at least one film region having:
   an average thickness of more than 0 and less than 14 micrometers with a standard deviation of 0.8 micrometer to 1.6 micrometers,
   a surface having a surface roughness average of less than 0.04 micrometer as measured by optical profilometry,
   a dielectric constant at 1 kHz and room temperature of at least 2.7,
   a dissipation factor at 1 kHz and room temperature of 1% or less, and
   a breakdown strength of at least 620 Volt/micrometer; and
   the copolycarbonate has a Tg of greater than 180° C. and comprises carbonate units derived from polymerization of 2,2-bis(4-hydroxyphenyl) propane and 2-phenyl-3,3-bis(4-hydroxyphenyl) phthalimidine.

2. A film comprising a copolycarbonate, the film is a uniaxially-stretched, extruded film comprising at least one film region having:
- an average thickness of more than 0 and less than 14 micrometers with a standard deviation of 0.8 micrometer to 1.6 micrometers,
- a surface having a surface roughness average of less than 0.04 micrometer as measured by optical profilometry,
- a dielectric constant at 1 kHz and room temperature of at least 2.7,
- a dissipation factor at 1 kHz and room temperature of 1% or less, and
- a breakdown strength of at least 620 Volt/micrometer; and
- the copolycarbonate has a Tg of greater than 180° C. and comprises carbonate units derived from a bisphenol compound of the formula

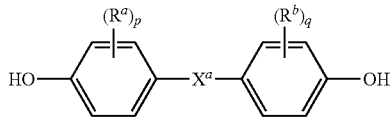

wherein
$R^a$ and $R^b$ are each independently a halogen atom or a monovalent hydrocarbon group,
p and q are each independently integers of 0 to 4, and wherein $X^a$ is cyclododecylidene or adamantylidene.

3. The film of claim 1, wherein the copolycarbonate has a Tg of 181.5° C. to 196° C.

4. The film of claim 1, wherein the film region has an average breakdown strength of greater than 900 Volts/micrometer with a standard deviation of 106 Volts/micrometer.

5. The film of claim 1, wherein the film region has a roughness value of less than 0.02 micrometer.

6. The film of claim 1, wherein no polymer other than the copolycarbonate is present in the film.

7. The film of claim 1, wherein
the film has a length of at least 10 meters, and a width of at least 300 millimeters; and
the film region is at least 80% of the area of the film.

8. The film of claim 1, wherein the film has a length of 100 to 10,000 meter, and a width of 300 to 3,000 millimeter.

9. The film of claim 1, wherein the film has less than 1,000 ppm of a compound having a molecular weight of less than 250 Dalton.

10. The film of claim 1, wherein the film has less than 50 ppm each of aluminum, calcium, magnesium, iron, nickel, potassium, manganese, molybdenum, sodium, titanium, and zinc.

11. The film of claim 1, comprising less than 1000 ppm each of a fluorine-containing compound or a silicone-containing compound.

12. The film of claim 1, comprising less than 100 ppm of a fluorine-containing compound or a silicone-containing compound.

13. The film of claim 1, wherein the film region has a roughness value Ra of less than 3% of the average thickness of the film.

14. An article comprising the film of claim 1, and a layer of a conductive metal deposited on at least a portion of the surface of the film.

15. The article of claim 14, wherein the conductive metal comprises aluminum, zinc, copper, or a combination comprising at least one of the foregoing.

16. The article of claim 15, wherein the conductive metal layer has a thickness of 1 to 3000 Angstroms.

17. A capacitor comprising the article of claim 14.

18. An electronic article comprising the capacitor of claim 17.

19. The film of claim 1 further comprising an antioxidant, a thermal stabilizer, a light stabilizer, an ultraviolet light (UV) absorbing additive, a quencher, a plasticizer, a lubricant, an antistatic agent, a flame retardant, an anti-drip agent, a radiation stabilizer, or a combination comprising at least one of the foregoing.

20. The film of claim 1 further comprising a poly(phenylene sulfone), a poly(sulfone), a poly(ether sulfone), a poly(arylene sulfone), a poly(phenylene ether), a poly(etherimide), a poly(etherimide sulfone), or a combination comprising at least one of the foregoing.

21. An article comprising the film of claim 2, and a layer of a conductive metal deposited on at least a portion of the surface of the film.

22. A capacitor comprising the article of claim 21.

23. An electronic article comprising the capacitor of claim 22.

* * * * *